(12) United States Patent
Chou (10) Patent No.: US 8,339,365 B2
(45) Date of Patent: Dec. 25, 2012

(54) COMPUTER MOUSE AND OPERATING METHOD THEREOF

(75) Inventor: Chun-Hung Chou, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 259 days.

(21) Appl. No.: 12/957,253

(22) Filed: Nov. 30, 2010

(65) Prior Publication Data

US 2012/0092256 A1    Apr. 19, 2012

(30) Foreign Application Priority Data

Oct. 15, 2010   (CN) .......................... 2010 1 0509955

(51) Int. Cl.
*G06F 3/033* (2006.01)

(52) U.S. Cl. .......................... 345/163; 361/631; 361/600

(58) Field of Classification Search .................... 361/600
See application file for complete search history.

(56) References Cited

U.S. PATENT DOCUMENTS

2006/0283694 A1* 12/2006 Tsuruoka et al. .......... 200/61.52

* cited by examiner

*Primary Examiner* — Bipin Shalwala
*Assistant Examiner* — Yaron Cohen
(74) *Attorney, Agent, or Firm* — Altis Law Group, Inc.

(57) ABSTRACT

A computer mouse includes a housing, a first container secured in the housing, and a second container secured in the first container, a timing unit, and a processor. The first container defines through holes. The first container and the second container are spaced by a distance to define a receiving space being partly filling in liquid. Suspending members extends through the through holes. One end of the suspending member is received in the receiving space. The density of the suspending members is less than that of the liquid Sensitive switches are attached to the first container. A method for the mouse includes determining whether any one of the second contacts is charged; generating a position signal, controlling the timing unit to time; determining the movement direction of the a cursor; determining the movement distance of the cursor; and generating cursor control signal for controlling movement of the cursor.

16 Claims, 6 Drawing Sheets

FIG 6

COMPUTER MOUSE AND OPERATING METHOD THEREOF

BACKGROUND

1. Technical Field

The present disclosure relates to computer peripherals and, particularly, to a computer mouse requiring no support surface and an operational method thereof.

2. Description of Related Art

As one of the main input devices for a computer, computer mice have become an inseparable part of desktop computer systems. A standard mouse requires a support surface, which may not always be convenient. 3D mice require no support surface, however, are relatively expensive.

BRIEF DESCRIPTION OF THE DRAWINGS

The components of the drawings are not necessarily drawn to scale, the emphasis instead being placed upon clearly illustrating the principles of a mouse and a method thereof. Moreover, in the drawings, like reference numerals designate corresponding parts throughout several views.

DETAILED DESCRIPTION

Figure 1:
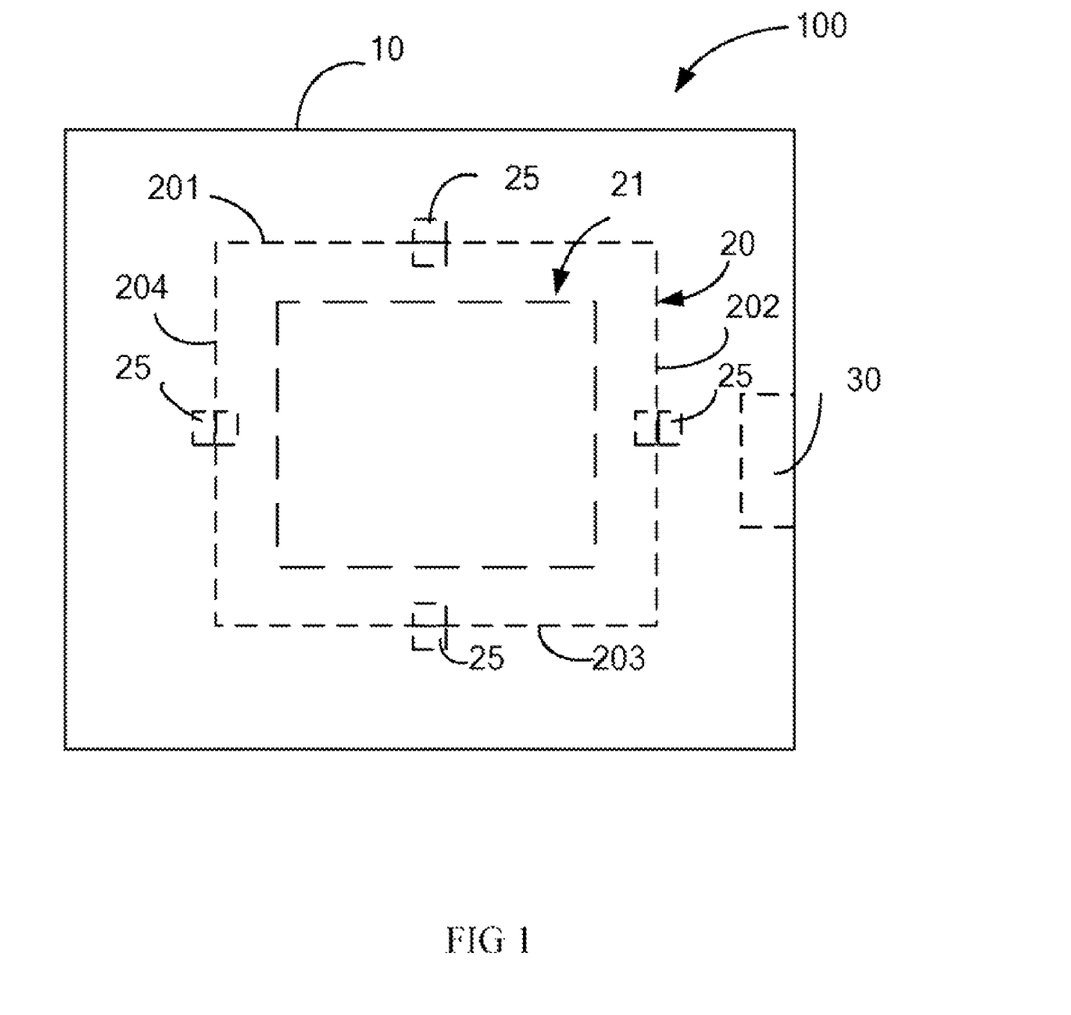
FIG. 1 is a schematic view of a mouse in accordance with an exemplary embodiment, viewed from the top.
Figure 2:
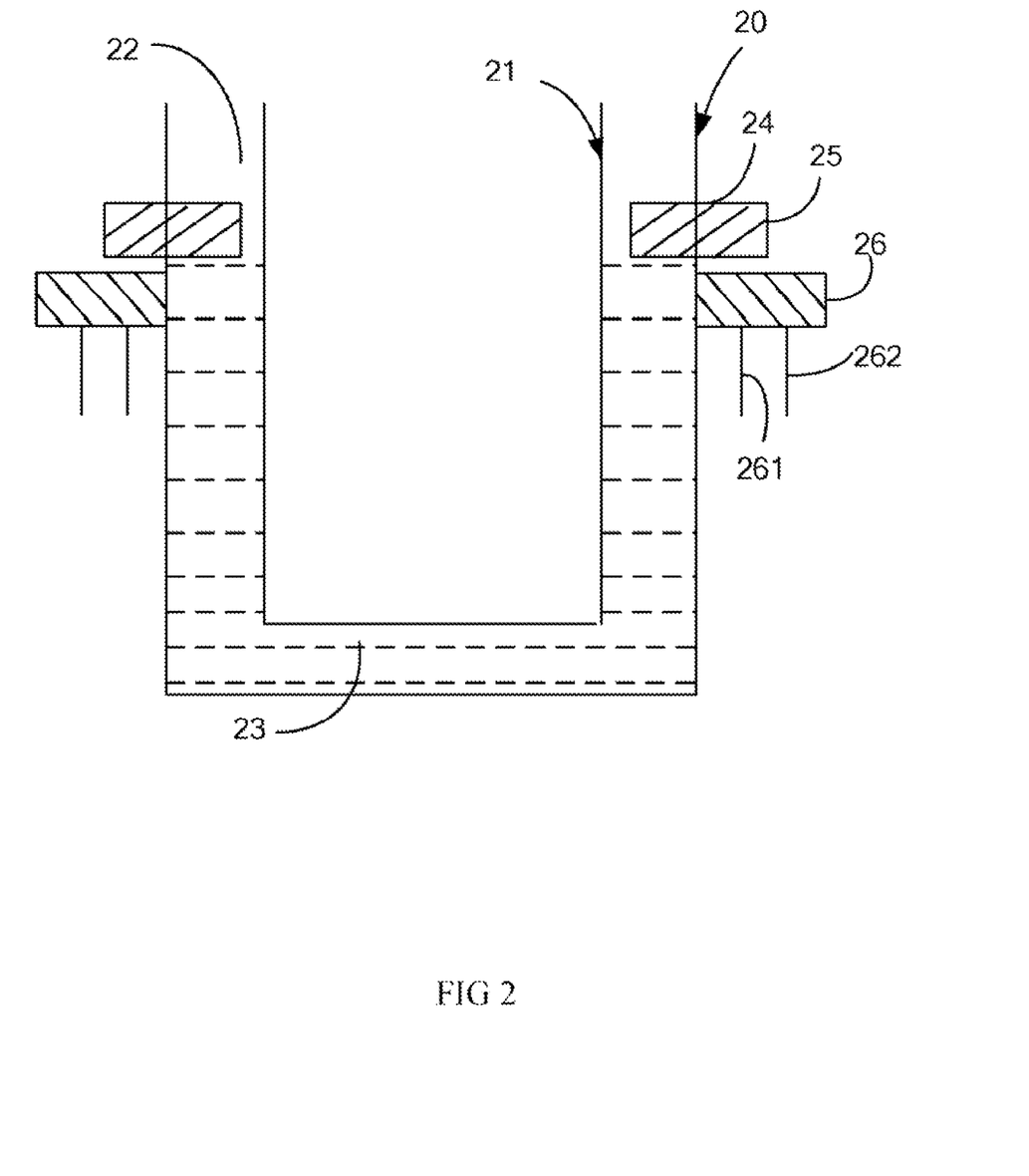
FIG. 2 is a schematic view of a first container of the mouse of FIG. 1 in accordance with an exemplary embodiment.

Embodiments of the present disclosure are now described in detail, with reference to the accompanying drawings. Referring to FIGS. 1-2, a computer mouse 100 (hereinafter referred to as "the mouse") includes a housing 10, a first container 20 secured within the housing 10, and a second container 21 secured within the first container 20. The first container 20 and the second container 21 are sealed and hollow. In the embodiment, the first container 20 and the second container 21 are substantially cubic. The first container 20 and the second container 21 are spaced by a distance to define a receiving space 22. In this embodiment, the receiving space 22 is substantially cubic. A portion of the receiving space 22 is filled with insulative liquid 23.

The first container 20 includes a first sidewall 201, a second sidewall 202, a third sidewall 203, and a fourth sidewall 204, connected end to end. The first sidewall 201 is parallel to the third sidewall 203, and the second sidewall 202 is parallel to the fourth sidewall 204. Each of the sidewalls 201, 202, 203, 204 defines at least one through hole 24. In the embodiment, four through holes 24 are deployed, and each of the sidewalls 201, 202, 203, 204 defines one through hole 24. The through holes 24 defined on the sidewalls 201, 202 align with each other, and the through holes 24 defined on the sidewalls 203, 204 align with each other. The liquid 23 is flush with the lower rim of each through hole 24. The mouse 100 further includes four suspending members 25. Each suspending member 25 extends through one through hole 24 with one end received in the receiving space 22 and an opposite end exposed to the first container 20. In this embodiment, the size of the portion of each suspending member 25 received in one through hole 24 is equal to that of the through hole 24, thus the liquid 23 cannot flow out of the through holes 24. In this embodiment, the density of the liquid 23 is greater than that of each suspending member 25, thus the ends of the suspending members 25 received in the receiving space 22 can be driven to tilt relative to the through hole 24 due to the buoyancy of the liquid 23.

In this embodiment, when the mouse 100 inclines forward, an end of the mouse 100 adjacent to the third sidewall 203 moves upward, an opposite side of the mouse 100 adjacent to the first sidewall 201 moves downward, the level of the liquid 23 adjacent to the first sidewall 201 rises, thus the end of the suspending member 25 attached to the first sidewall 201 and received in the receiving space 22 moves upward from buoyancy, and the opposite end exposed to the first container 20 moves downward. In the similar principle, when the mouse 100 inclines backward, inclines leftward, inclines rightward, the end of the suspending member 25 attached to the third sidewall 203, the fourth sidewall 204, the second sidewall 202 respectively move upward from buoyancy, and the opposite ends exposed to the first container move downward.

The mouse 100 further includes four sensitive switches 26 respectively attached to the sidewalls 201, 202, 203, 204 and exposed to the first container 20. In the embodiment, each sensitive switch 26 is under one through hole 24. Each sensitive switch 26 includes a first contact 261 and a second contact 262. The first contact 261 is charged, and the second contact 262 is uncharged. The first contact 261 of one sensitive switch 26 is electrically connected to its second contact 262 when the sensitive switch 26 is activated. When the mouse 100 inclines forward, the end of the suspending member 25 adjacent to first sidewall 201 and exterior to the first container 20 moves downward and contacts the sensitive switch 26 attached to the first sidewall 201. When the sensitive switch 26 is contacted, the sensitive switch 26 is activated, and the first contact 261 of the contacted sensitive switch 26 is electrically connected to the second contact 262 of the contacted sensitive switch 26, thus the second contact 262 of the contacted sensitive switch 26 becomes charged. Similarly, when the mouse 100 respectively inclines backward, leftward, rightward, the sensitive switch 26 attached to the third sidewall 203, the fourth sidewall 204, the second sidewall 202 are contacted, and the second contact 262 of the contacted sensitive switch 26 respectively attached to the third sidewall 203, the fourth sidewall 204, the second sidewall 202 become charged.

The mouse 100 further includes a number of buttons (not shown) on the housing 10 for computer programmed click-function.

Figure 3:
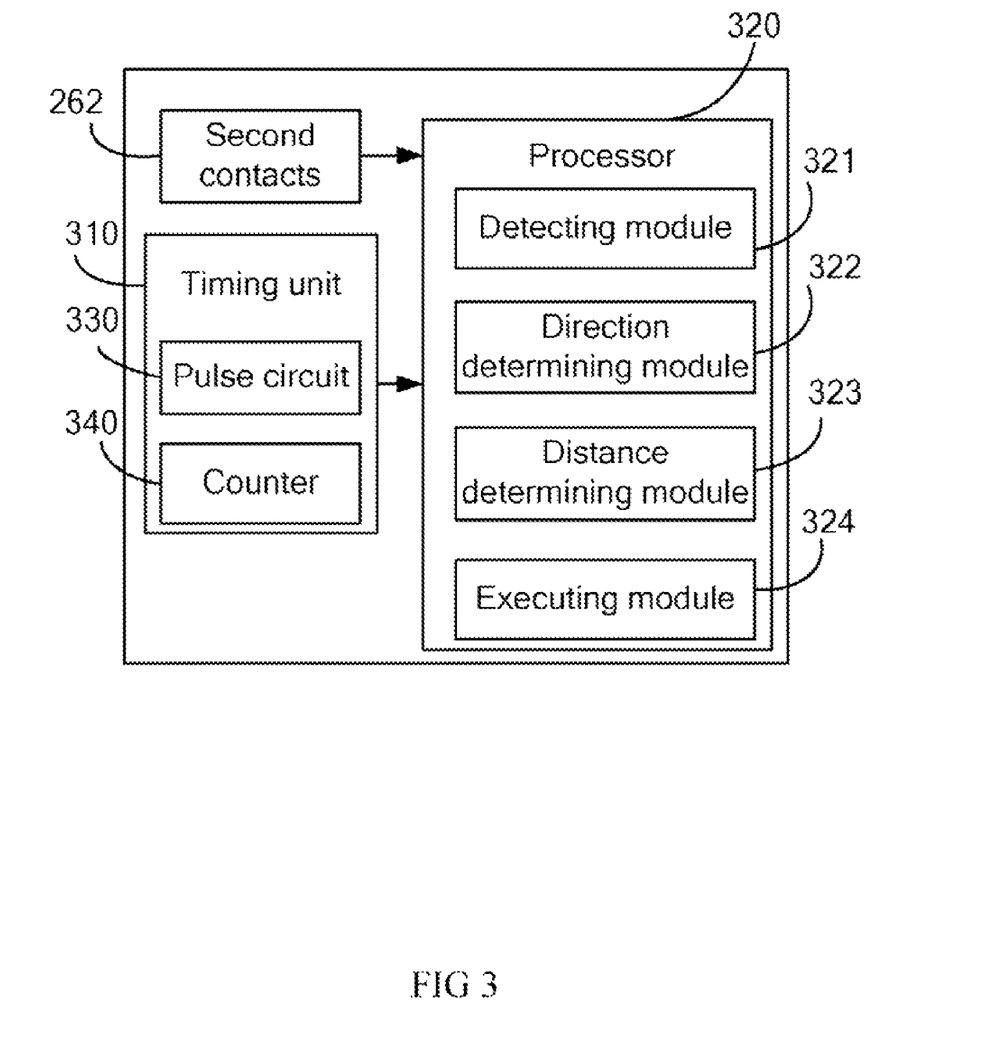
FIG. 3 is a block diagram of a mouse in accordance with an exemplary embodiment.

The mouse 100 further includes a circuit board 30. Referring to FIG. 3, the circuit board 30 includes a timing unit 310 and a processor 320. The timing unit 310 times the duration of any second contacts being charged lasting. In the embodiment, the timing unit 310 includes a pulse circuit 330 and a counter 340. The pulse circuit 330 generates pulse signals. The counter 340 is electrically connected to the pulse circuit 330 to count the number of the pulse signals.

The processor 320 includes a detecting module 321, a direction determining module 322, a distance determining module 323, and an executing module 324.

The detecting module 321 is electrically connected to the second contacts 262, the pulse circuit 330, and the counter 340. The detecting module 321 is configured to determine whether any second contact 262 is charged, direct the pulse circuit 330 to generate pulse signals within the period of the second contact 262 being charged, and then direct the counter 340 to calculate the number of the pulse signals. The detecting module 321 further generates a position signal recording the position of the charged second contact 262. The detecting module 321 is further configured to reset the counter 340 when the charged second contact 262 becomes uncharged.

The direction determining module 322 is configured to determine the movement direction of a cursor according to the position signal identifying the position of the second contact 262 generated by the detecting module 321. If the position signal recording the position of the second contact 262 of the contacted sensitive switch 26 is forward, the direction determining module 322 determines that the movement direction of the cursor is upward. And if the position signal recording the position of the second contact 262 of the contacted sensitive switch 26 are backward, leftward, rightward, the direction determining module 322 determines that the movement direction of the cursor respectively are downward, left, right.

The distance determining module 323 is configured to determine the movement distance of the cursor according to the number of pulse signals and a first table showing below. The table is stored in a storage unit (not shown). The table includes a first column recording numbers of the pulse signals and a second column recording movement distances of the cursor corresponding to the numbers of the pulse signals. Typically, each movement distance of the cursor corresponds to one pulse signal, and the movement distance is equal to the number of pixels.

| First Table | |
| --- | --- |
| Number of the pulse signals | Movement distance of the cursor |
| 1 | 4 pixel |
| 2 | 8 pixel |
| ... | ... |
| n | 2n pixel |

The executing module 324 is configured to generate cursor control signals for controlling a movement of the cursor according to the determined movement direction and the determined movement distance.

Figure 4:
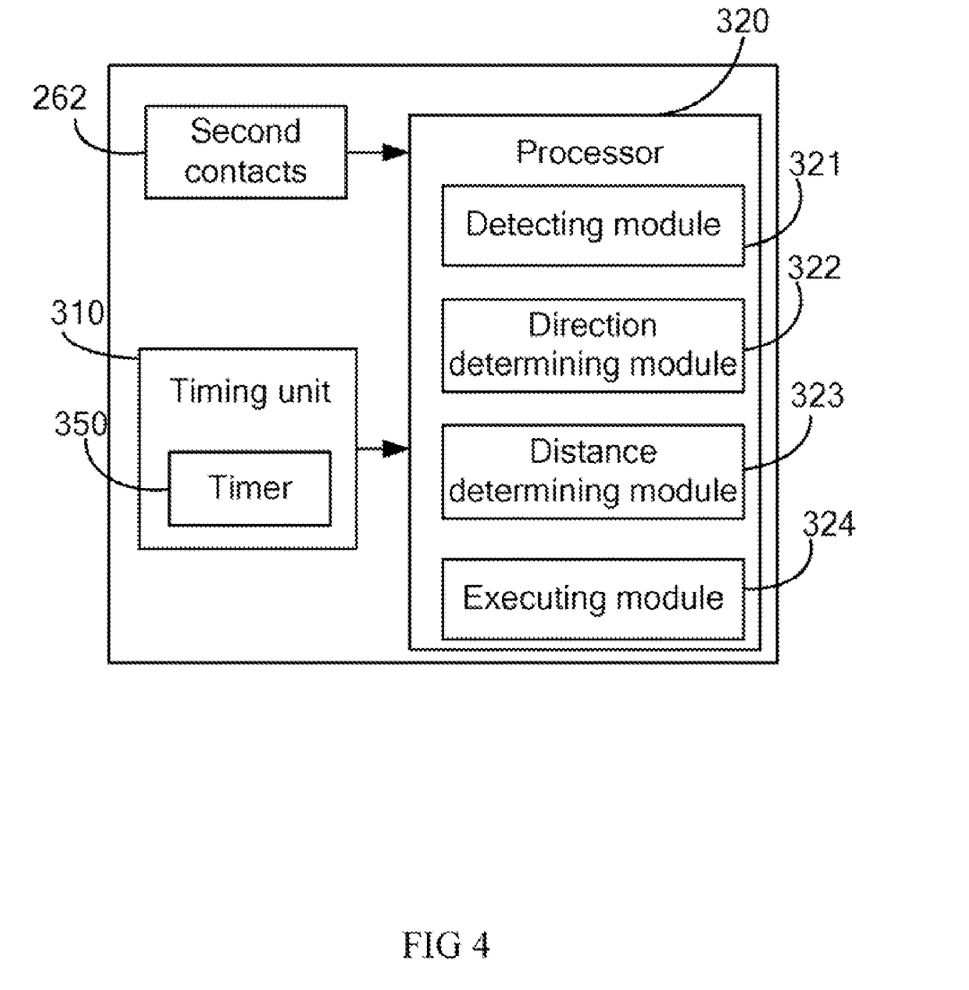
FIG. 4 is a block diagram of a mouse in accordance with another exemplary embodiment.

Referring to FIG. 4, in an alternative embodiment, the timing unit 310 includes a timer 350. The timer 350 is electrically connected to the processor 320. The detecting module 321 is configured to control the timer 350 to time within the period of one second contact 262 being charged. The detecting module 321 further resets the timer 350 when the charged second contact 262 becomes uncharged. The distance determining module 323 determines the movement distance of the cursor according to the time timed by the timer 350 and a second table shown as below. The second table is stored in the storage unit (not shown). The second table includes a first column recording time and a second column recording movement distances. Typically, each time corresponds to one movement distance, and the movement distance is equal to the number of pixels.

| Second Table | |
| --- | --- |
| Time | Movement distance of the cursor |
| 1 | 5 pixel |
| 2 | 10 pixel |
| ... | ... |
| n | 5n pixel |

Figure 5:
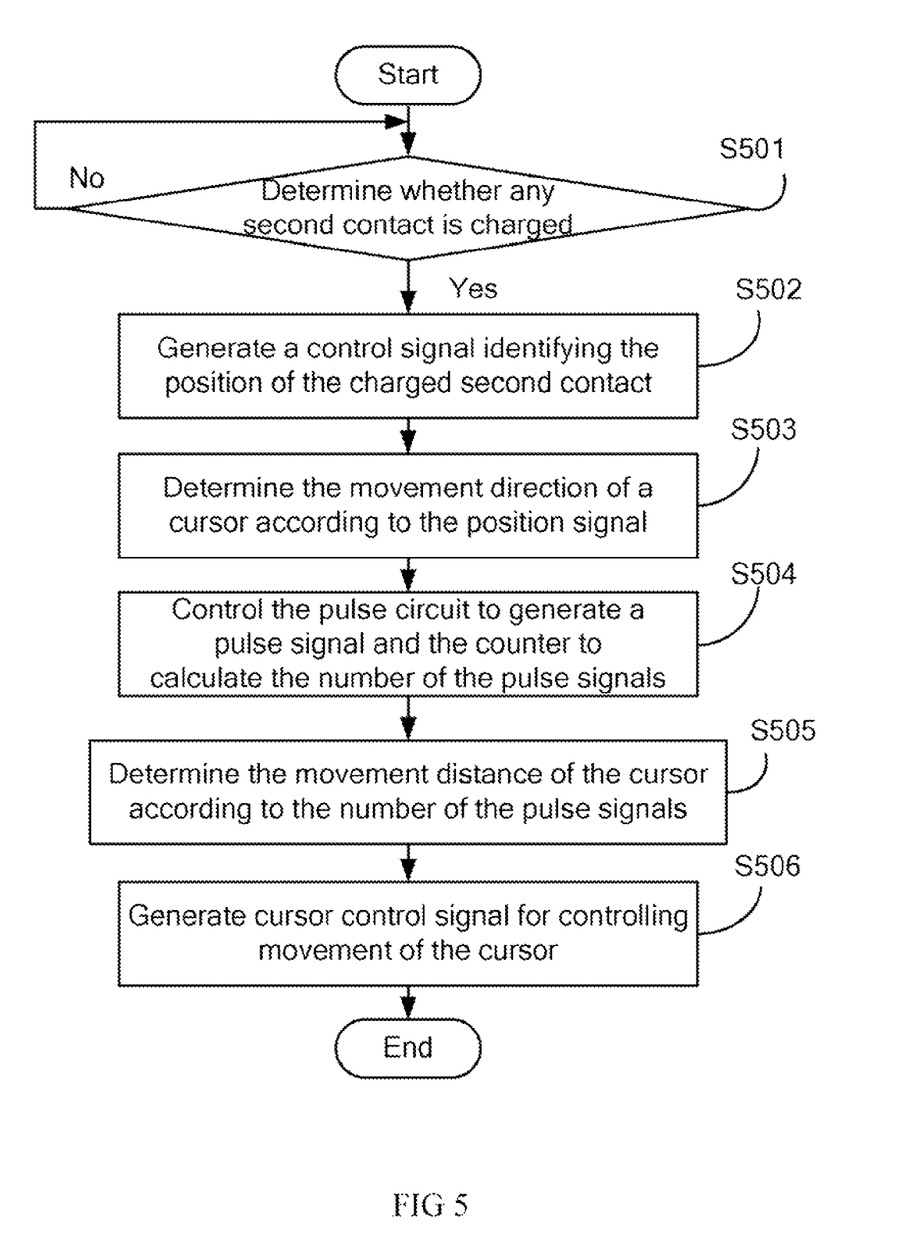
FIG. 5 is a flowchart of an operating method of a mouse, such as, for example, that of FIG. 3 in accordance with an exemplary embodiment.

FIG. 5 is a flowchart of a method for illustrating the work principle of the mouse 100 in accordance with an exemplary embodiment.

In step S501, the detecting module 321 detects whether any second contact 262 is charged. If yes, step S402 is implemented. If no, step S401 is repeated.

In step S502, the detecting module 321 generates a position signal recording the position of the charged second contact 262.

In step S503, the direction determining module 322 determines the movement direction of the cursor according to the position signal.

In step S504, the detecting module 321 controls the pulse circuit 330 to generate a pulse signal within the period of the charged second contact 262 being uncharged, and control the counter 340 to calculate the number of the pulse signals.

In step S505, the distance determining module 323 determines the movement distance of the cursor according to the number of the pulse signals.

In step S506, the executing module 324 generates cursor control signal for controlling the movement of the cursor according to the determined movement direction and the determined the movement distance.

Figure 6:
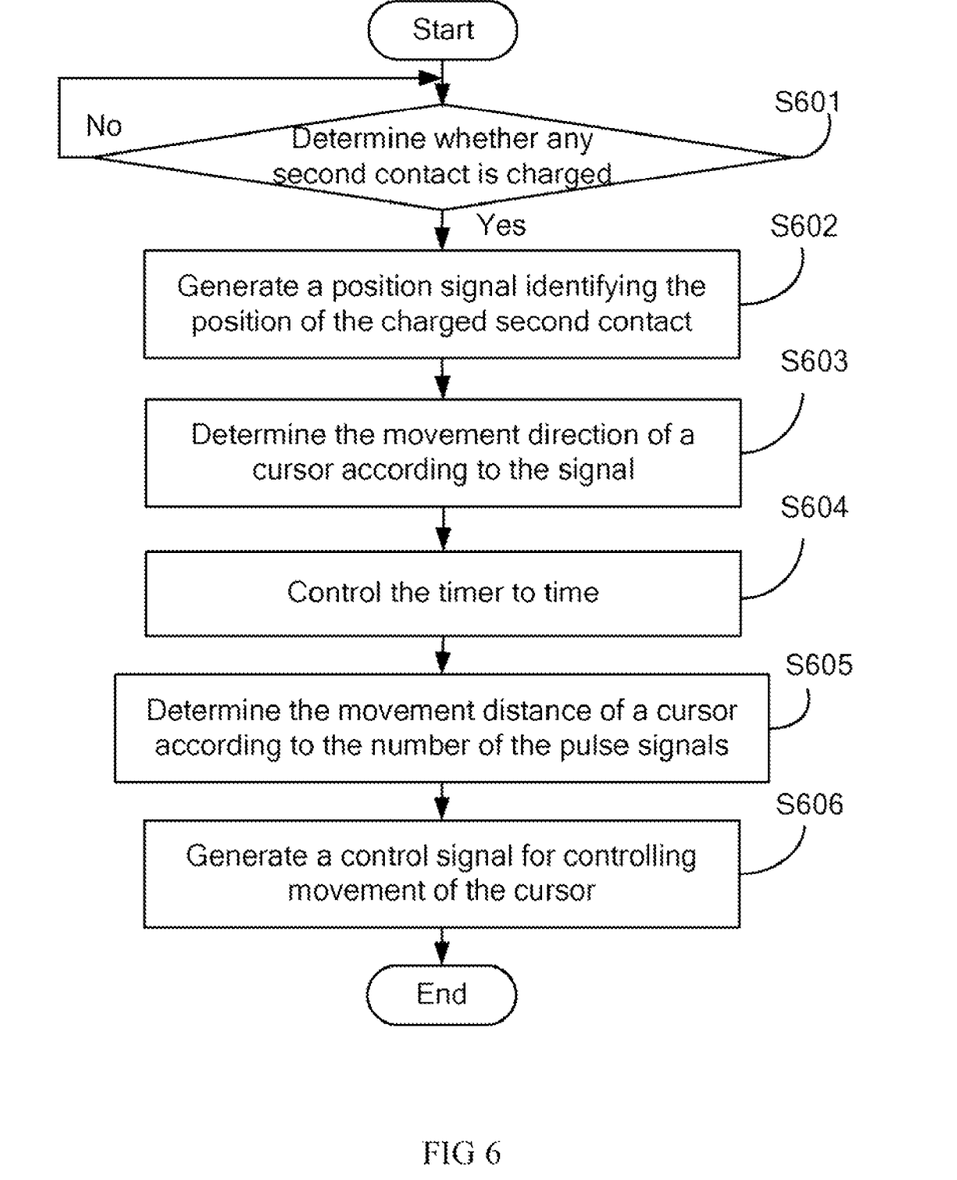
FIG. 6 is a flowchart of an operating method of a mouse, such as, for example, that of FIG. 4 with another exemplary embodiment.

Referring to FIG. 6, an alternative method for illustrating work principle of the mouse 100 in accordance with another embodiment.

In step S601, the detecting module 321 detects whether any second contact 262 is charged. If yes, step S502 is implemented. If no, the procedure is repeated.

In step S602, the detecting module 321 generates a position signal recording the position of the charged second contact 262.

In step S603, the direction determining module 322 determines the movement direction of the cursor according to the position signal recording the position of the charged second contact 262.

In step S604, the detecting module 321 controls the timer 350 to time within the period of the charged second contact 262 being uncharged.

In step S605, the distance determining module 323 determines the movement distance of the cursor according to the time timed by the timer 350.

In step S606, the executing module 324 generates cursor control signal for controlling movement of the cursor according to the determined movement direction and the determined movement distance.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mouse comprising:
a housing;
a first container secured in the housing and comprising a plurality of sidewalls, each of the sidewalls of the first container defining at least one through hole;
a second container secured in the first container, the first container and the second container being spaced by a distance to define a receiving space, the receiving space being partly filled with insulative liquid, the liquid being flush with the lower rim of each of the through holes;
a plurality of suspending members, each of the suspending members extending through one of the though holes, an end of each of the suspending members being received in the receiving space, an opposite end of each of the suspending members being exterior to the first container, the density of the suspending members being less than that of the liquid, the ends of the suspending members received in the receiving space being capable of being driven to tilt relative to the through hole due to the buoyancy of the liquid;
a plurality of sensitive switches attached to the sidewalls of the first container, each of the sensitive switches being adjacent to one of the through holes, each of the sensitive switches comprising a first contact and a second contact, each of the first contacts being charged, each of the second contacts being uncharged, when the suspending member contacting the sensitive switch, the sensitive switch being activated, the first contact of the contacted sensitive switch being electrically connected to the second contact of the contacted sensitive switch and the second contact of the contacted sensitive switch being charged;
a timing unit configured to time the duration of any second contact being charged lasting;
a processor comprising:
a detecting module electrically connected to the second contacts and configured to determine whether any one of the second contacts is charged, direct a timing unit to time the duration of the second contact being charged lasting, and further generate a position signal recording the position of the charged second contact;
a direction determining module configured to determine the movement direction of a cursor according to the position signal generated by the detecting module;
a distance determining module configured to determine the movement distance of the cursor according to the time timed by the timing unit and a first table; and
an executing module configured to generate cursor control signal for controlling movement of the cursor according to the determined movement direction and the determined movement distance.

2. The mouse as described in claim 1, wherein the timing unit comprises a pulse circuit and a counter, the pulse circuit generates pulse signals, the counter counts the number of the pulse signals, the detecting module is configured to direct the pulse circuit to generate pulse signals during the period of the any one of the second contact being charged, direct the counter to calculate the number of the pulse signals, the distance determining module is configured to determine the movement distance of the cursor according to the number of the pulse signals and the first table.

3. The mouse as described in claim 1, wherein the timing unit comprises a timer, the detecting module is configured to direct the timer to time during the period of the any one of the second contact being charged, the distance determining module is configured to determine the movement distance of the cursor according to the time timed by the timer and the first table.

4. The mouse as described in claim 2, wherein the detecting module is further to reset the counter when the charged second contact becomes uncharged.

5. The mouse as described in claim 3, wherein the detecting module is further to reset the timer when the charged second contact becomes uncharged.

6. The mouse as described in claim 2, wherein the first table comprises a first column recording the number of the pulse signals, and a second column recording the movement distance of the cursor, the movement distance corresponds to a number of pixels, each one of pulse signals corresponds to one movement distance of the cursor.

7. The mouse as described in claim 3, wherein the second table comprises a first column recording the time timed by the timer and a second column recording movement distance of the cursor, the movement distance corresponds to the number of pixels, each one corresponds to one movement distance.

8. The mouse as described in claim 1, wherein the through holes are evenly distributed in the sidewalls of the first container.

9. The mouse as described in claim 1, wherein each of the sensitive switches is under one of the through holes.

10. A method for a mouse, the mouse comprising a housing, a first container secured in the housing and comprising a plurality of sidewalls, each of the sidewalls defining at least one through hole, a second container secured in the first container, the first container and the second container being spaced by a distance to define a receiving space, the receiving space being partly filled in insulative liquid, the liquid being flush with the lower rim of each of the through holes, a plurality of suspending member extending through the through holes, each of the suspending members extending through one of the through holes, an end of each of the suspending members being received in the receiving space, an opposite end of each of the suspending members being exterior to the first container, the density of the suspending members being less than that of the liquid, the ends of the suspending members received in the receiving space being capable of being driven to tilt relative to the through hole due to the buoyancy of the liquid, a plurality of sensitive switches being attached to the sidewalls of the first container, when the suspending member contacting the sensitive switch, the sensitive switch being activated, the first contact of the contacted sensitive switch being electrically connected to the second contact of the contacted sensitive switch and the second contact of the contacted sensitive switch being charged, a timing unit timing the time of any second contact being charged lasting, the method comprising:
determining whether any one of the second contacts is charged;
if one second contact is charged, generating a position signal identifying the position of the charged second contact, controlling the timing unit to time the time of any second contact being charged lasting;
determining the movement direction of the a cursor according to the position signal recording the position of the charged second contact;
determining the movement distance of the cursor according to the time timed by the timing unit and a first table; and
generating cursor control signal for controlling movement of the cursor according to the determined movement direction and the determined movement distance.

11. The method as described in claim 10, wherein the timing unit comprising a pulse circuit generating pulse signals and a counter counting the number of the pulse signals, the method comprises:

if one second contact is charged, generating a position signal identifying the position of the charged second contact, controlling the pulse circuit to generate pulse signals within the period of the charged second contact being uncharged and controlling the counter to calculate the number of the pulse signals;

determining the movement distance of the cursor according to the number of the pulse signals and a first table.

12. The method as described in claim 11 further comprising: resetting the counter when the charged second contact becomes uncharged.

13. The method as described in claim 11, wherein the first table comprises a first column recording the number of the pulse signals and a second column recording the movement distance, the movement distance corresponds to a number of pixels, each pulse signal corresponds to one movement distance.

14. The method as described in claim 10, wherein the timing unit comprising a timer timing, the method comprises:

if one second contact is charged, generating a position signal identifying the position of the charged second contact, controlling the timer to time within the period of the charged second contact being uncharged;

determining the movement distance of the cursor according to the time timed by the timer and a first table.

15. The method as described in claim 14 further comprising: resetting the timer when the charged second contact becomes uncharged.

16. The method as described in claim 14, wherein the first table comprises a first column recording the time timed by the timer and a second column recording the movement distance, the movement distance corresponds to a number of pixels, each pulse signal corresponds to one movement distance.

* * * * *